United States Patent [19]

Haass

[11] Patent Number: 4,852,082

[45] Date of Patent: Jul. 25, 1989

[54] CIRCUIT ARRANGEMENT FOR TESTING THE OPERABILITY OF THE DATA TRANSMISSION FACILITY

[75] Inventor: Adolf Haass, Munich, Fed. Rep. of Germany

[73] Assignee: Siemens Aktiengesellschaft, Berlin and Munich, Fed. Rep. of Germany

[21] Appl. No.: 281,873

[22] Filed: Dec. 7, 1988

Related U.S. Application Data

[63] Continuation of Ser. No. 161,345, Feb. 19, 1988, abandoned, which is a continuation of Ser. No. 45,760, Apr. 28, 1987, abandoned, which is a continuation of Ser. No. 717,841, Mar. 29, 1985, abandoned.

[30] Foreign Application Priority Data

Mar. 30, 1984 [DE] Fed. Rep. of Germany ....... 3411903

[51] Int. Cl.$^4$ .......................... H04B 3/32; H04B 3/20
[52] U.S. Cl. .................... 370/32; 370/32.1; 379/406
[58] Field of Search .......... 370/32, 32.1, 13; 379/406–411; 375/10; 455/15, 24, 63, 67

[56] References Cited

U.S. PATENT DOCUMENTS

| | | | |
|---|---|---|---|
| 3,206,559 | 9/1965 | Barney | 179/170.2 |
| 3,721,777 | 3/1973 | Thomas | 179/170.2 |
| 4,117,277 | 9/1978 | van den Elzen et al. | 379/406 |
| 4,355,214 | 10/1982 | Levy et al. | |
| 4,355,406 | 10/1982 | Guidoux | |
| 4,539,675 | 9/1985 | Fisher | 370/32 |
| 4,549,049 | 10/1985 | Guidoux | 179/170.2 |
| 4,562,312 | 12/1985 | Duttweiler | 370/32.1 |
| 4,571,720 | 2/1986 | Chevreau et al. | 370/32.1 |

FOREIGN PATENT DOCUMENTS 0014505 8/1980 European Pat. Off.
328779 5/1930 United Kingdom ............ 179/170.4

OTHER PUBLICATIONS

Publication entitled: "Digital Echo Cancellation for Baseband Data Transmission", IEE Transactions on Acoustics, Speech, and Signal Processing, vol. AS-SP-27, No. 6, Dec. 1979, By Niek A. M. Verhoeckx et al., pp. 768–781.

Primary Examiner—Robert L. Griffin
Assistant Examiner—Marianne Huseman
Attorney, Agent, or Firm—Hill, Van Santen, Steadman & Simpson

[57] ABSTRACT

A circuit arrangement is provided for completely testing the operability of a data transmission facility which has a four-wire connected to a two-wire line via a hybrid and in which an echo compensation circuit is connected between the data signal output line and the data signal receiving line of the circuit arrangement. The data signals appearing on the data signal output line are supplied to the hybrid without delay as well as delayed by a fixed time interval which is selected to exceed the longest time leading to a correlation between delayed and undelayed data signals. The echo compensation circuit is driven only with the delayed data signals.

6 Claims, 10 Drawing Sheets

CIRCUIT ARRANGEMENT FOR TESTING THE OPERABILITY OF THE DATA TRANSMISSION FACILITY

CROSS-REFERENCE TO RELATED APPLICATIONS

This is a continuation of application Ser. No. 61,345, filed Feb. 19, 1988, now abandoned, which is a continuation of application Ser. No. 45,760, filed Apr. 28, 1987, now abandoned, which is a continuation of application Ser. No. 717,841, filed Mar. 29, 1985, now abandoned.

BACKGROUND OF THE INVENTION

1. Field of the Invention

The present invention relates to a circuit arrangement for testing the operability of a data transmission facility connected, on the one hand, to a data signal output line and to a data signal receiving line and, on the other hand, to a transmission line usable for a full-duplex data signal transmission, the data transmission facility comprising an echo compensation circuit between the data signal output line and the data signal receiving line with whose assistance the signal components proceeding onto the data signal receiving line in the data signal transmission from the data signal output line onto the transmission line may be compensated, whereby the data signal output line and the data signal receiving line, as well as the transmission line, are connected to one another via a hybrid circuit.

2. Description of the Prior Art

Data transmission facilities of the aforementioned type are already generally known for example from "IEEE Transactions on Acoustics, Speech, and Signal Processing", Vol. ASSP-27, No. 6, December 1979, pp. 768-781, particularly FIG. 2, from U.S. Pat. No. 4,355,214, and from U.S. Pat. No. 4,355,406, all of which are fully incorporated herein by this reference. Such data transmission facilities, however, cannot be checked for operability without further techniques when only the data signal output line and the data signal receiving line are available for test purposes. When, in particular, a data signal to be referred to as a test word is emitted via the data output line to the respective transmission facility, then the signal components of this test word which proceed onto the data signal receiving line are compensated by the echo compensation circuit. The echo compensation circuit could, in fact, be disabled in order to in turn accept the test word via the data signal receiving line, namely the test word that had been previously output via the data signal output line. Connected therewith, however, would be the disadvantage that the echo compensation circuit would not be involved in the testing procedure.

SUMMARY OF THE INVENTION

It is accordingly the object of the present invention to provide a circuit arrangement of the type generally set forth above which is designed so that the entire data transmission facility, including its compensation circuit, can be checked as to its operability.

The above object is achieved by a circuit arrangement which is characterized in that the data signals appearing on the data signal output line are supplied to the hybrid undelayed and delayed by a delay device, in that the data signals appearing on the data signal output line are supplied to the echo compensation circuit delayed by way of the delay device, and in that the delay time introduced by the delay device is selected to be greater than the time which leads to a correlation of delayed and undelayed data signals in the echo compensation circuit.

A circuit arrangement constructed in accordance with the present invention may also be characterized in that the data signals appearing on the data signal output line are supplied to the hybrid both undelayed and delayed by a delay device, in that the data signals appearing on the data signal output line are supplied undelayed to the echo compensation circuit, and that the delay time introduced by the delay device is selected to be greater than the time leading to a correlation of undelayed and delayed data signals in the echo compensation circuit plus the duration of the longest possible pulse response signals output by the echo compensation circuit.

A circuit arrangement constructed in accordance with the present invention may also be characterized in that the data signals appearing on the data signal output line are supplied to the hybrid as well as to the echo compensation circuit delayed by way of a delay device, in that the output signals of the echo compensation circuit or the data signals appearing on the data signal receiving line are combined with the data signals appearing undelayed on the data signal output line, and that the time delay introduced by the delay device is selected to be greater than the time which leads to a correlation of undelayed and delayed data signals in the echo compensation circuit.

A circuit arrangement constructed in accordance with the invention may also be characterized in that the data signals appearing on the data signal output line are supplied undelayed both to the hybrid and to the echo compensation circuit, in that the output signals of the echo compensation circuit or the data signals appearing on the data signal receiving line are combined with the data signals appearing on the data signal output line delayed by a delay device, and in that the delay time introduced by the delay device is selected to be greater than the time leading to a correlation of undelayed and delayed data signals in the echo compensation circuit plus the duration of the longest possible pulse response signals output by the echo compensation circuit.

The invention offers the advantage that one can manage with a relatively low circuit expense in order to be able to completely test a data transmission facility of the type generally mentioned, i.e. including its echo compensation circuit, as to its operability. The echo compensation circuit does not compensate all data signals supplied via the data signal output line in an operating condition, but only compensates those signals which lie in the operating range of the echo compensator. The length of this operating range is dependent on the number of coefficients employed and on the correlation length of the data signals which is employed, this in turn depending on the coding or, respectively, modulation method. The test can therefore be simply executed in this manner proceeding, for example, from the data terminal equipment that is connected both to the data signal output line and to the data signal receiving line.

BRIEF DESCRIPTION OF THE DRAWINGS

Other objects, features and advantages of the invention, its organization, construction and operation will be best understood from the following detailed description, in conjunction with the accompanying drawings, in which.

DESCRIPTION OF THE PREFERRED EMBODIMENTS

Figure 1:
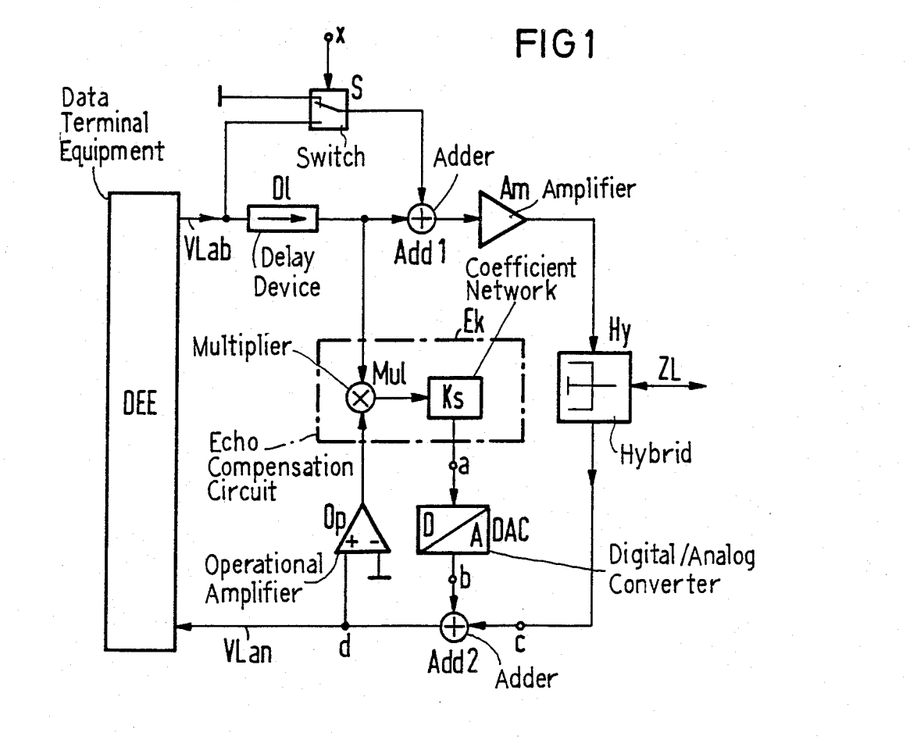
FIG. 1 is a schematic block diagram showing a circuit arrangement constructed in accordance with the principles of the present invention.
Figure 2:
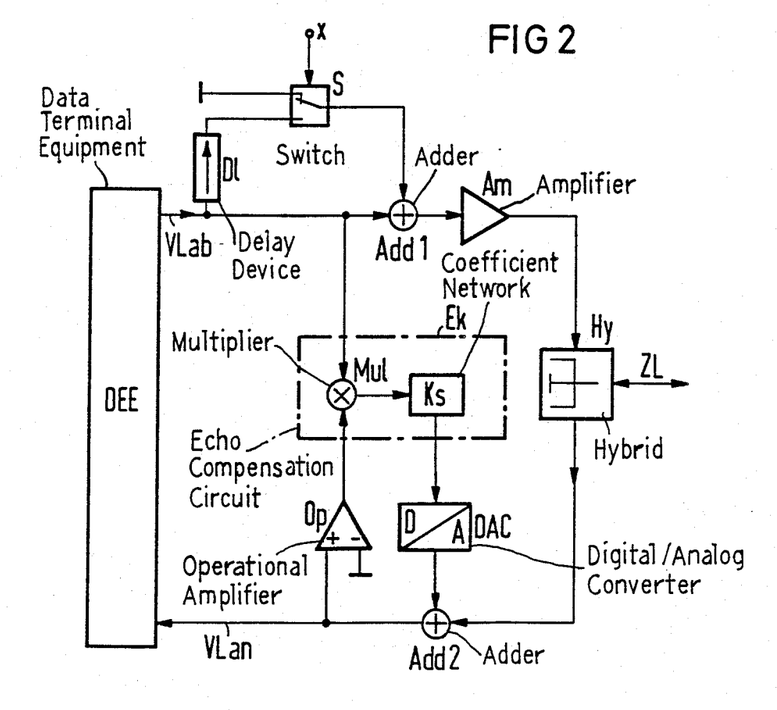
FIG. 2 is a schematic block diagram of a second embodiment of the invention.
Figure 3:
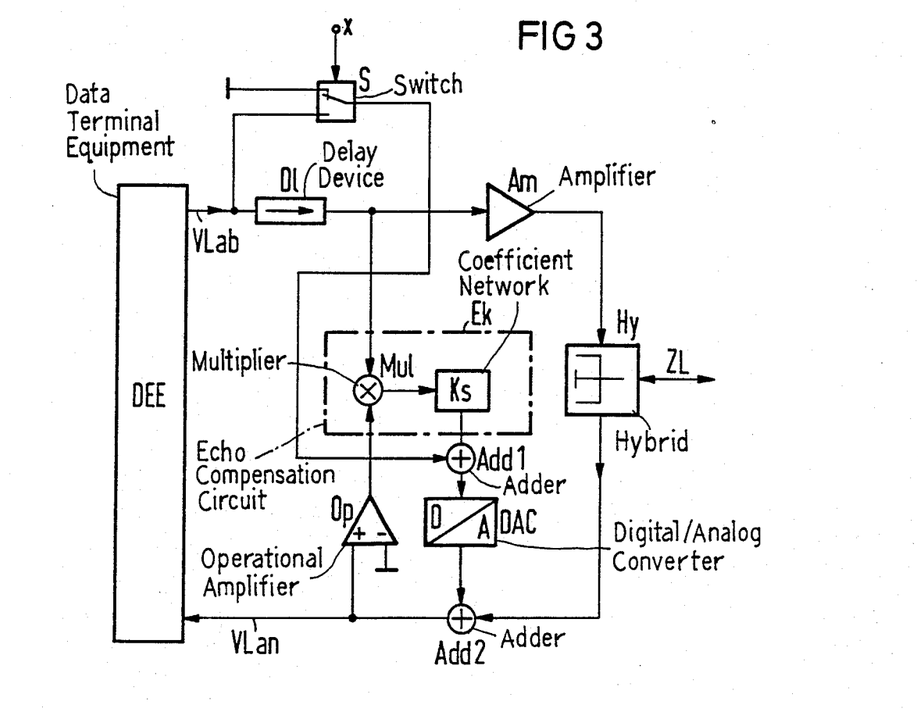
FIG. 3 is a block diagram of a third embodiment of the invention.
Figure 4:
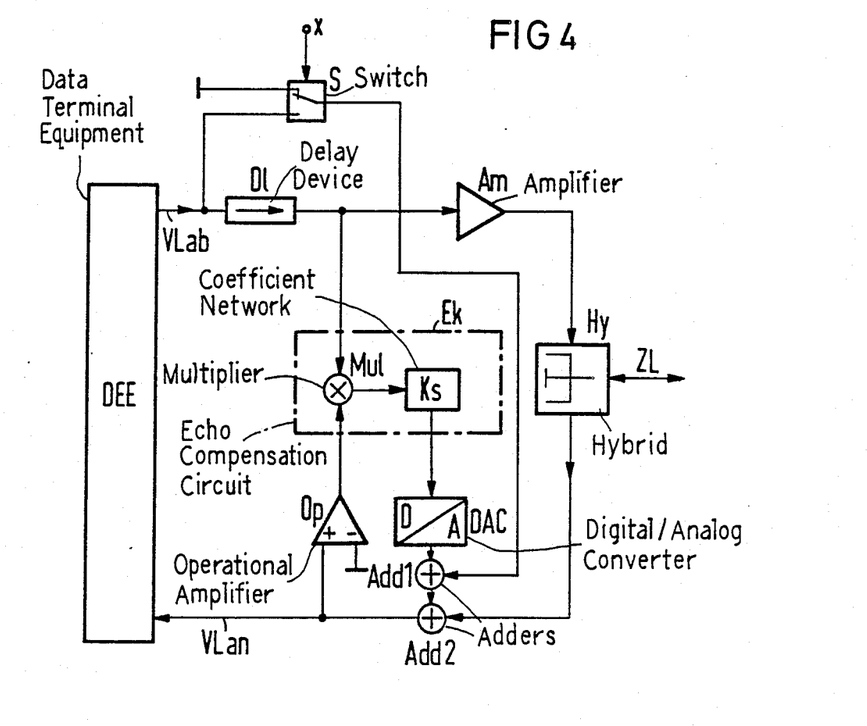
FIG. 4 is a block diagram of a fourth embodiment of the invention.
Figure 5:
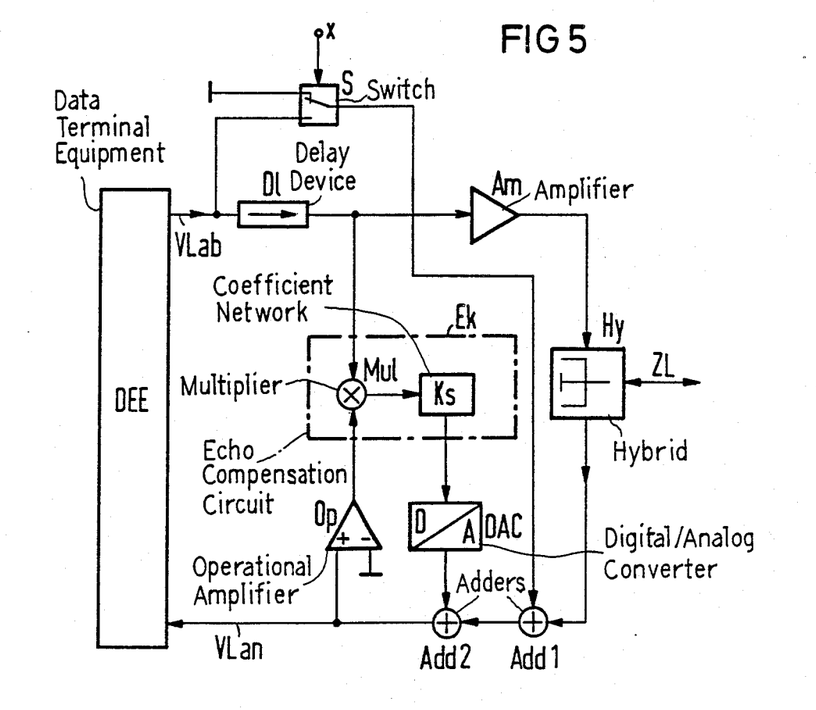
FIG. 5 is a diagram of a fifth embodiment of the invention.
Figure 6:
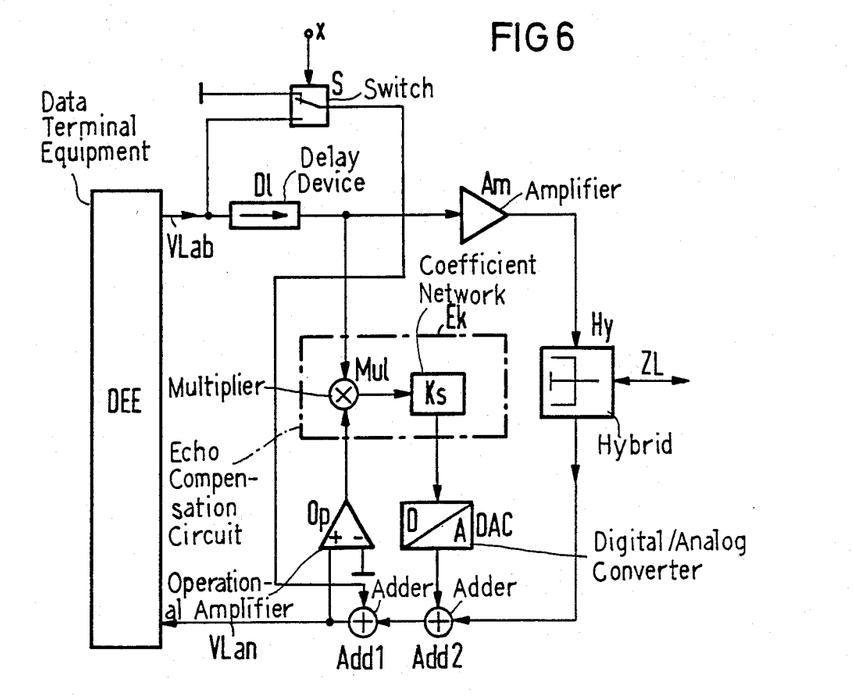
FIG. 6 is a block diagram of a sixth embodiment of the invention.
Figure 7:
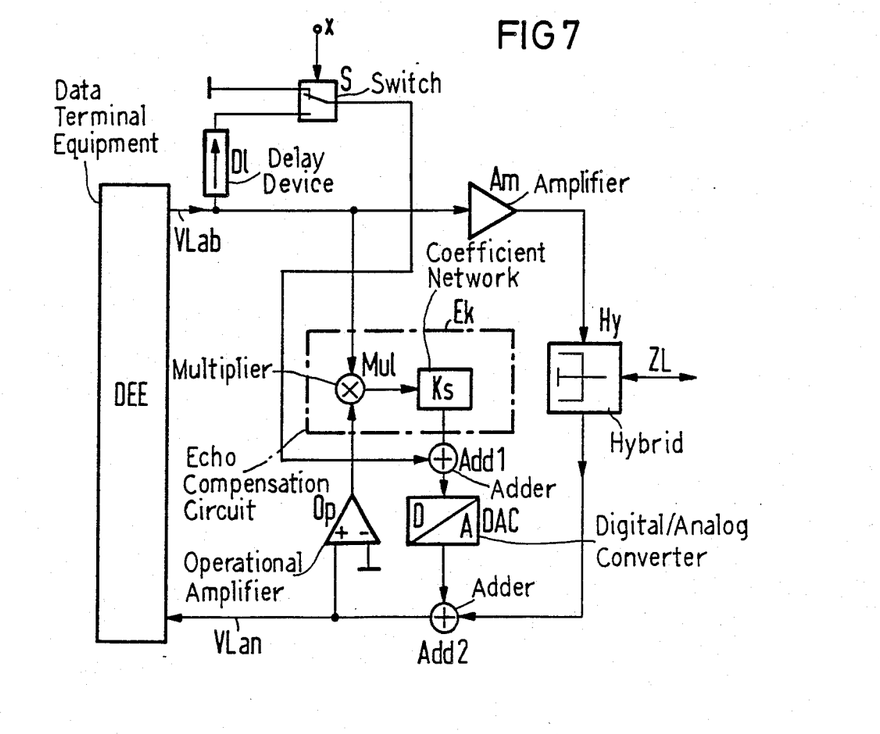
FIG. 7 is a block diagram of a seventh embodiment of the invention.
Figure 8:
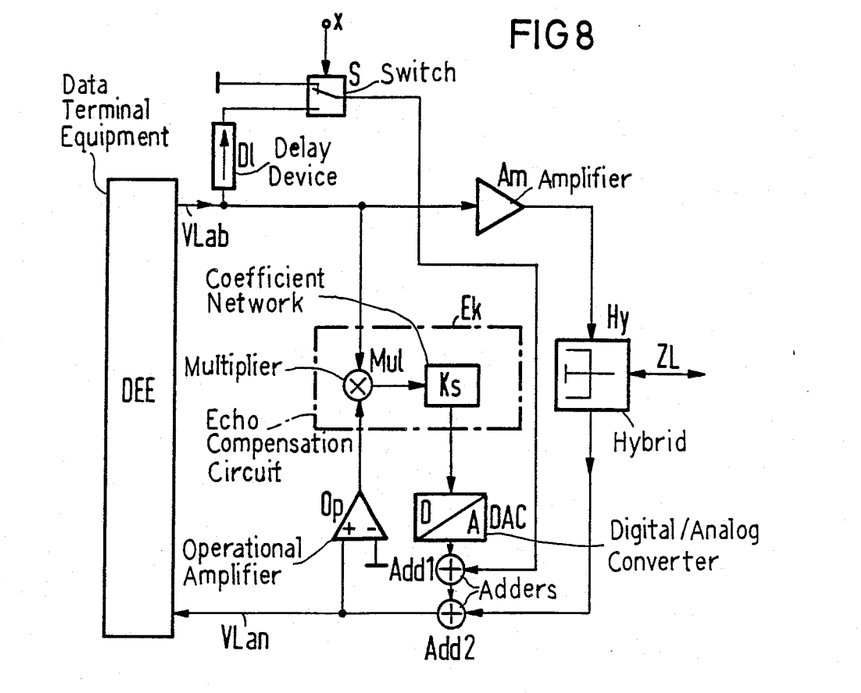
FIG. 8 is a block diagram of an eighth embodiment of the invention.
Figure 9:
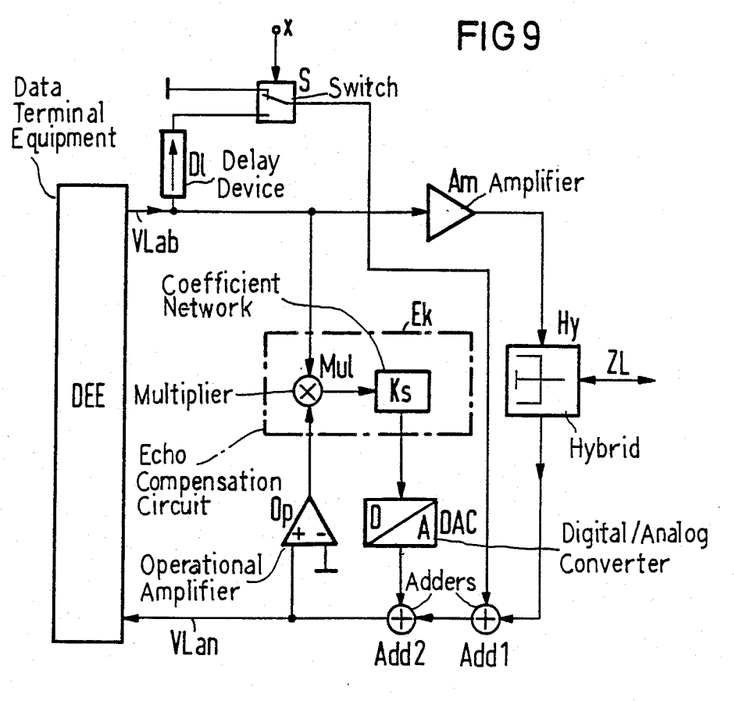
FIG. 9 is a block diagram of a ninth embodiment of the invention.
Figure 10:
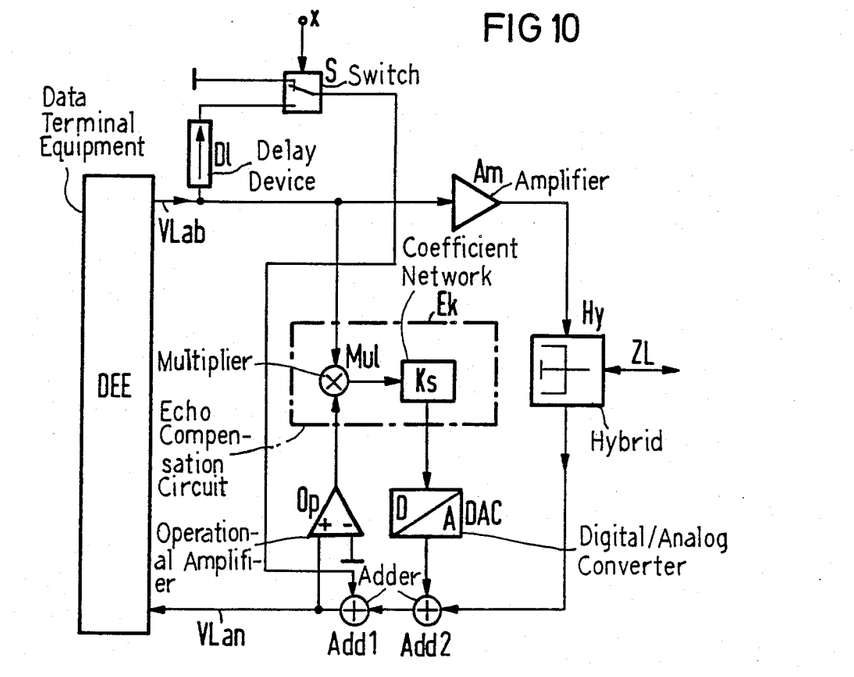
FIG. 10 is a block diagram showing a tenth embodiment of the invention.

FIG. 1 illustrates a data transmission facility which comprises a data signal output line VLab and a data signal receiving line VLan. These two data signal lines belonging overall to a four-wire line are connected via a hybrid Hy to a transmission line ZL representing a two-wire line by way of which the data signals can be transmitted in full-duplex operation. In the present case, the data transmission facility is connected with its two data signal lines to a data terminal equipment DEE which is capable of outputting as well as receiving data signals.

The series connection of a delay device Dl, an adder Add1 and an amplifier Am is located in the data signal output line VLab. By way of a transfer switch S, a further input of the adders Add1 is either directly connected to ground or, respectively, chassis ground potential (zero potential) or, on the other hand, is connected to the data signal output line VLab. The switch position of the switch S is dependent on whether a binary signal "0" or "1" is supplied to the setting input of the switch, this input being connected to a control terminal x. The output of the amplifier Am is directly connected to an input of the hybrid Hy.

The input of an echo compensation circuit Ek is connected to the output of the delay device. At its output side, the echo compensation circuit Ek is connected to an input of a further adder Add2 which has a further input and its output lying in the data signal receiving line VLan. In the present case, a digital/analog converter DAC is connected between one input of the adder Add2 and the output of the echo compensation circuit Ek. The use of this converter occurs in the present case in consideration of the fact that the echo compensation circuit Ek outputs digital signals at its output. Such echo compensation circuits are basically well known in the art (for example, in conjunction with known data transmission facilities of the type initially mentioned).

The echo compensation circuit Ek comprises a coefficient network Ks which is selectable by way of the output of a multiplier Mul. Different coefficients which are employed for the echo compensation in the adder Add2 are actuated in accordance with the various output signals of the multiplier Mul. The multiplier Mul of the echo compensation circuit Ek is connected, on the one hand, to the output of an operational amplifier Op serving as a comparator. The operational amplifier Op has its non-inverting input (+) connected to the output of the adder Add2 and its inverting input (−) connected to ground potential. At its other input, the multiplier Mul is directly connected to the output of the aforementioned delay device Dl.

The structure of the circuit arrangement shown on FIG. 1 having been explained above, the manner of operation of this circuit arrangement shall now be considered in detail. It is first assumed that the circuit arrangement is to be employed for a normal data signal transmission. In this case, the switch S1 is set in the position shown on the drawing. This means that only the signal delayed by the delay device Dl is supplied to the adder Add1 at its input side. This delay data signal is therefore supplied both to the echo compensation circuit Ek and to the amplifier Am and, therefore, to the hybrid Hy. The crosstalk or, respectively, echo signals appearing via the hybrid Hy in this case are compensated by corresponding compensation signals which the echo compensation circuit Ek is just emitting via the digital/analog converter DAC. It is thereby assumed that a certain correlation time is present between the time of appearance of the data signals at the input of the echo compensation circuit Ek, on the one hand, and the signal components to be compensated on the data signal receiving line, on the other hand; expressed in other words, this means that the echo compensation circuit Ek generates a pulse response or, respectively, a pulse response signal of a specific length (chronological duration) for compensation of the crosstalk signal in response to each data pulse supplied thereto at its input side.

In order, then, to be able to test the operability of the circuit arrangement shown in FIG. 1, i.e. in order, so to speak, to lay a test loop proceeding from the data terminal equipment DEE which only comprises the circuit arrangement shown on the drawing, the switch S is placed into its switch position opposite to that shown on the drawing. To this end, a corresponding setting signal is supplied to the control terminal. Therefore, a data signal output by the data terminal equipment DEE is supplied to the adder Add1 without delay, on the one hand, (via the switch S) and, on the other hand, delayed by the delay device Dl. The output signal of the adder is supplied via the amplifier Am to the hybrid Hy. The delayed, but not amplified, data signal which appears at the output of the delay device Dl is thereby employed for setting the echo compensation circuit Ek.

With respect to the aforementioned delay device Dl, it should be pointed out that the same delays the signal supplied thereto by a fixed time interval T which is at least long enough that the data signals at the input and at the output of the delay device are no longer correlated. This time is dependent on the coding or, respectively, modulation procedure that is employed. The selection of such a delay time does not have a deleterious effect on the echo compensation in normal data signal transmission operation, since the appertaining signals are simultaneously supplied to the input of the hybrid Hy and to the input of the echo compensation circuit Ek. During a test mode in which the switch S is located in its switch position opposite to that shown on the drawing, the echo compensation circuit Ek is set such that it undertakes a compensation with respect to the data signal elements supplied thereto from the output of the delay device D1. This, however, means that a compensation with respect to the undelayed data signals supplied to the hybrid Hy does not occur. A pre-requisite for error free operation in this context is that the delay time of the delay device D1 meets the above-specified condition.

Due to the operating mode described above, the data terminal equipment DEE shown on the drawing receives data signal elements returned thereto which correspond to the data signal elements which had been previously output by the data terminal equipment DEE. If the same data signal elements that were transmitted were not to proceed back to the data terminal equipment DEE while the circuit arrangement under consideration is located in a test mode, then a defect is present in the test loop comprising the delay device D1, the adder Add1, the amplifier Am, the echo compensation circuit Ek, the digital/analog converter DAC and the adder Add2.

Finally, it should also be pointed out that a circuit arrangement constructed in accordance with the present invention could also be realized in some other manner differing from that shown in FIG. 1. Thus, the adder Add1 could also be definitely provided at those locations at which the circuit points a, b, c and d are indicated in FIG. 1. In these cases, an additional signal would be supplied via the switch S for the signal appearing at the appertaining circuit points. Moreover, it is also possible to insert the delay device D1 into the connection which proceeds by way of the switch S to the one input of the adder Add1, i.e. both to the circuit arrangements specifically shown on in FIG. 1 and to those cases in which the adder Add1 is inserted into the respective connecting line at the locations that are marked a, b, c, or, respectively, d. In these cases, however, the delay time introduced by the delay device is to be selected greater than the sum of the time which leads to a correlation of undelayed and delayed data signals in the echo compensation circuit and the duration of the longest possible pulse response signal output by the echo compensation circuit examples of the various possible above described embodiments are illustrated in FIGS. 2 through 10 wherein like reference characters refer to like parts.

Although I have described my invention by reference to particular embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement for testing the operability of a data transmission facility connected between a two-wire transmission line for full-duplex data signal transmission and a four-wire line which includes a data signal output line and a data signal receiving line, in which an echo compensation circuit is connected between the data signal output line and the data signal receiving line for compensating signal components proceeding onto the data signal receiving line during data signal transmission from the data signal output line so that a definite correlation time is provided between the time of emission of compensation signals and the time of the signals to be compensated, and in which the data signal output line and the data signal receiving line are connected to the two-wire line by way of a hybrid, the improvement therein comprising:

first means including adder means serially connected in the data signal output line, said first means including delay means connected to said adder means for supplying delayed data signals appearing on the data signal output line to said adder means and to said hybrid via said adder means and to the echo compensation circuit delayed by a predetermined interval; and second means including switch means connected to the data signal output line and to said adder means and operable to supply the data signals undelayed to said adder means and to said hybrid via said adder means;

said predetermined interval of delay of said delay means being selected to be greater than the time which leads to a correlation of the delayed data signals appearing on the data signal output line and the data signals appearing on the data signal receiving line in the echo compensation circuit.

2. In a circuit arrangement for testing the operability of a data transmission facility connected between a two-wire transmission line for full-duplex data signal transmission and a four-wire line which includes a data signal output line and a data signal receiving line, in which an echo compensation circuit is connected between the data signal output line and the data signal receiving line for compensating signal components proceeding onto the data signal receiving line during data signal transmission from the data signal output line so that a defined correlation time is provided between the time of emission of compensation signals and the time of the signals to be compensated, and in which the data signal output line and the data signal receiving line are connected to the two-wire line by way of a hybrid, the improvement therein comprising:

first means, including delay means and adder means serially connected to the data signal output line for supplying data signals appearing on the data signal output line undelayed and delayed by a predetermined interval to the hybrid; and means for supplying data signals appearing on the data signal output line undelayed to the echo compensation circuit;

the predetermined interval being selected to be greater than the time leading to a correlation of undelayed data signals appearing on the data signal output line and the data signals appearing on the data signal receiving line in the echo compensation circuit plus the duration of the longest possible pulse response signals output by the echo compensation circuit.

3. In a circuit arrangement for testing the operability of a data transmission facility connected between a two-wire transmission line for full-duplex data signal transmission and a four-wire line which includes a data signal output line and the data signal receiving line, in which an echo compensation circuit is connected between the data signal output line and the data signal receiving line for compensating signal components proceeding onto the data signal receiving line during data signal transmission from the data signal output line so that a defined correlation time is provided between the time of emission of compensation signals and the time of the signals to be compensated, and in which the data signal output line and the data signal receiving line are connected to the two-wire line by way of a hybrid, the improvement therein comprising:

first means including delay means connected to the data signal output line for supplying data signals appearing on the data signal output line to the hybrid delayed and to the echo compensation circuit delayed by a predetermined interval;

second means for combining the data signals appearing on the data signal receiving line with the data signals appearing undelayed on the data signal output line; said predetermined interval being selected to be greater than the time which leads to a correlation of the delayed data signals appearing on the data signal output line and the combined data signals appearing on the data signal receiving line in the echo compensation circuit.

4. In a circuit arrangement for testing the operability of a data transmission facility connected between a two-wire transmission line for full-duplex data signal transmission and a four-wire line which includes a data signal output line and a data signal receiving line, in which an echo compensation circuit is connected between the data signal output line and the data signal receiving line for compensating signal components proceeding onto the data signal receiving line during data signal transmission from the data signal output line so that a defined correlation time is provided between the time of emission of compensation signals and the time of the signals to be compensated, and in which the data signal output line and the data signal receiving line are connected to the two-wire line by way of a hybrid, the improvement therein comprising:

first means including delay means for supplying data output signals appearing on the data signal output line, delayed by a predetermined interval, to the echo compensation circuit and to the hybrid; second means for combining the output signals of the echo compensation circuit with the undelayed data signals on the data signal output line; and third means including a means for combining the output of the second means with the data signals appearing on the data signal receiving line the predetermined delay time being selected to be greater than the time leading to a correlation of the delayed data signals appearing on the data signal output line and the combined data signals appearing on the data signal receiving line in the echo compensation circuit plus the duration of the longest possible pulse response output by the echo compensation circuit.

5. In a circuit arrangement for testing the operability of a data transmission facility connected between a two-wire transmission line for full-duplex data signal transmission and a four-wire line which includes a data signal output line and data signal receiving line, in which an echo compensation circuit is connected between the data signal output line and the data signal receiving line for compensating signal components proceeding onto the data signal receiving line during data signal transmission from the data signal output line so that a defined correlation time is provided between the time of emissions of compensation signals and the time of the signals to be compensated, and in which the data signal output line and the data signal receiving line are connected to the two-wire line by way of a hybrid, the improvement therein comprising:

first means for supplying data signals appearing on the data signal output line undelayed to the hybrid and undelayed to the echo compensation circuit; and second means including delay means connected to the data signal output line for supplying data output signals appearing on the data output line delayed by a predetermined interval, said second means including means for combining the data signals appearing on the data signal receiving line with the delayed data signals appearing on the data signal output line;

the predetermined delay of time being selected to be greater than the time leading to a correlation of undelayed data signals appearing on the data signal output line and combined data signals appearing on the data signal receiving line and the echo compensation circuit plus the duration of the longest possible pulse response output by the echo compensation circuit.

6. In a circuit arrangement for testing the operability of a data transmission facility connected between a two-wire transmission line for full-duplex data signal transmission and a four-wire line which includes the data signal output line and a data signal receiving line, in which an echo compensation circuit is connected between the data signal output line and the data signal receiving line for compensating signal components proceeding onto the data signal receiving line during data signal transmission from the data signal output line so that a defined correlation time is provided between the time of emission of compensation signals and the time of signals to be compensated, and in which the data signal output line and the data signal receiving line are connected to the two-wire line by way of a hybrid, the improvement therein comprising:

first means for supplying data signals appearing on the data signal output line undelayed to the hybrid and undelayed to the echo compensation circuit; and second means including delay means connected to the data signal output line for supplying data output signals appearing on the data output line delayed by a predetermined interval, said second means for combining the output signals of the echo compensation circuit with the delayed data signals appearing on the data signal output line; and third means including a means for combining the output of the second means with the data signals appearing on the data signal receiving line the predetermined delay of time being selected to be greater than the time leading to a correlation of undelayed and delayed data signals in the echo compensation circuit plus the duration of the longest possible pulse response output by the echo compensation circuit.

* * * * *